United States Patent
Hauer et al.

(10) Patent No.: US 7,014,082 B2
(45) Date of Patent: Mar. 21, 2006

(54) METHOD AND DEVICE FOR CUTTING FLAT WORK PIECES MADE OF A BRITTLE MATERIAL

(75) Inventors: Dirk Hauer, Ingelheim (DE); Berndt Hoetzel, Woerrstadt (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/941,338

(22) Filed: Sep. 15, 2004

(65) Prior Publication Data

US 2005/0029321 A1 Feb. 10, 2005

Related U.S. Application Data

(62) Division of application No. 10/149,781, filed as application No. PCT/EP00/12460 on Dec. 9, 2000, now Pat. No. 6,811,069.

(30) Foreign Application Priority Data

Dec. 31, 1999 (DE) ................................ 199 63 939

(51) Int. Cl.
*B23K 26/38* (2006.01)
(52) U.S. Cl. .................................. 225/93.5; 219/121.72
(58) Field of Classification Search ............... 225/93.5; 219/121.67, 121.68, 121.69, 121.72
See application file for complete search history.

(56) References Cited

U.S. PATENT DOCUMENTS

| | | | | |
|---|---|---|---|---|
| 4,725,709 A | * | 2/1988 | Mattelin | 219/121.8 |
| 5,609,284 A | * | 3/1997 | Kondratenko | 225/1 |
| 6,112,967 A | * | 9/2000 | Ostendarp et al. | 225/93.5 |
| 6,236,446 B1 | * | 5/2001 | Izumi et al. | 349/187 |
| 6,635,848 B1 | * | 10/2003 | Hauer et al. | 219/121.72 |
| 6,723,952 B1 | * | 4/2004 | Choo et al. | 219/121.72 |
| 6,800,831 B1 | * | 10/2004 | Hoetzel | 219/121.72 |
| 6,811,069 B1 | * | 11/2004 | Hauer et al. | 225/93.5 |

* cited by examiner

*Primary Examiner*—Kenneth E. Peterson
(74) *Attorney, Agent, or Firm*—Michael J. Striker

(57) ABSTRACT

The apparatus for cutting a flat glass work piece along a curved dividing line includes a laser generating a laser beam having a linear beam profile and an optical system with a scanner for producing a curvilinear focal point from the laser beam. The apparatus also moves a cold spot along the curved dividing line following the curvilinear focal point. A trajectory control device controls the position of the curvilinear focal point on the curved dividing line via actuators. A profile control device controls the contour of the curvilinear focal point according to trajectory data from the curved dividing line, so that all points of the curvilinear focal point lie on or coincide with the curved dividing line. The apparatus adjusts the length of the curvilinear focal point by adjusting scanning amplitude of the scanning motion.

11 Claims, 3 Drawing Sheets

METHOD AND DEVICE FOR CUTTING FLAT WORK PIECES MADE OF A BRITTLE MATERIAL

CROSS-REFERENCE

This is a divisional of U.S. patent application, Ser. No. 10/149,781, filed Jun. 13, 2002, which has now been allowed as U.S. Pat. No. 6,811,069, which is a 371 of PCT/EP00/12460, filed Dec. 09, 2000.

DESCRIPTION

The invention is based on a method for cutting flat work pieces made of a brittle material, in particular glass or ceramic, in which a laser beam having a linear beam profile followed by a cold spot is moved along a dividing line having a specified contour. A preferred application of the method is in the cutting of flat glasses.

The invention is based further on a device for cutting a work piece of this type using a laser beam in the form of a linear beam profile followed by a cold spot.

Conventional methods for cutting flat glasses are based on the use of a diamond or a small rotary cutter to first produce a scribed line in the glass in order to then break the glass by application of an external mechanical force along the weak point produced in this fashion ("laser scribe and break"). The disadvantage of this method is that the scribed line causes particles (fragments) to be released from the surface, which said particles can deposit on the glass and scratch it, for example. Additionally, "chips" can be created in the cut edge, which results in an uneven glass edge. Furthermore, the micro-cracks produced in the cut edge during the scribing process lead to reduced mechanical stressability, i.e., to increased risk of breakage.

An approach for preventing the formation of fragments as well as chips and micro-cracks is to cut glass based-on thermally induced mechanical tension. In this approach, a heat source directed at the glass is moved at a fixed speed relative to the glass, thereby producing such a high thermal mechanical tension that cracks form in the glass. Infrared emitters, special gas burners and lasers, in particular, possess the necessary property of the heat source to position the thermal energy locally, i.e., with an accuracy of greater than one millimeter, which corresponds to typical cutting accuracies. Lasers have proven to be effective and have gained acceptance due to their good focusability, good controllability of output, and the ability to shape the beam and, therefore, to distribute intensity on glass. As a result, the glass can first be scribed using the laser beam and then broken mechanically. Or, the glass can be separated directly using the beam in conjunction with a mechanically-applied starting fissure, i.e., it can be cut. The terms "separate/divide" or "cut" are intended to encompass the terms "scribe-break" as well as "cut".

This laser beam separating method—which induces a thermal mechanical tension up to above the breaking strength of the material by means of local heating using the focused laser beam in conjunction with cooling applied from the outside—has been made known in numerous publications, e.g., in EP 0 872 303 A 2.

The laser beam separating methods mentioned hereinabove differ in particular by the configuration of the focal point. The method according to DE 693 04 194 T 2, for example, uses a laser beam having an elliptical cross section followed by a cold spot.

The publication EP 0 872 303 A 2 cited hereinabove describes a laser beam separating method that provides a focal point having a U-shaped or V-shaped contour that opens in the direction of separation. Contours derived from these, such as X-shaped focal points, are also described. In both cases, the laser beam focal points have a two-dimensional structure that has proven effective in accomplishing straight cuts. When making freeform cuts, a curved, two-dimensional focal point adapted to the contour of the dividing line would have to be produced and moved along the contour, including the cooling that follows said focal point. This would require, in particular, coupling the scanner device producing the respective two-dimensional focal point plus the cold spot device to a trajectory control device, the realization of which is very problematic due to the large quantities of data to be exchanged and the cutting speeds required.

A laser beam separating method has been made known in DE 43 05 107 C 2 in which the laser beam is shaped statically, i.e., using stationary optical components, in such a fashion that its beam cross-section has a linear shape on the surface of the work piece, and in which the ratio of length and width of the impinging beam cross-section can be adjusted using an aperture in the laser beam path. This method is greatly restricted as well in terms of its usability. Due to the static generation of the linear focal point, freeform cuts cannot be accomplished and, because the cooling is not to be applied until after the dividing line has been heated completely, e.g., using a jet of cold compressed air, the known method is suited practically only for use as described to cut off the extruded rim of hollow glassware, in which method the hollow glassware rotates in the stationary laser beam, whereby the rim is first heated all the way around its circumference by means of the laser beam and then cooled in supportive fashion by flowing off the gas.

SUMMARY OF THE INVENTION

The invention is based on the object of carrying out the method described initially in such a fashion, and of designing the associated device in such a fashion that freeform cuts can be accomplished relatively easily using the laser beam separating method.

Based on the method for cutting flat work pieces made of a brittle material, in which a laser beam having a linear beam profile followed by cold spot is moved along a dividing line having a specified contour, the object is attained according to the method by the fact that a linear focal point is produced on the work piece by scanning the laser beam, and trajectory data from the dividing line are made available during every scanning motion such that the linear focal point undergoes curvature corresponding to the curvature of the contour of the dividing line by adjusting the scanning amplitude.

As a result of these measures, it is possible to accomplish freeform cuts having any shape, because the linear focal point—in contrast-to two-dimensional focal points with manageable quantities of data—can be adjusted in terms of its curvature and, in fact, in accordance with the contour of the dividing line, so that the focal point is kept on this dividing line while the length of the linear focal point is adapted to the curvature of the contour, so that, when small radii of curvature are involved, the length of the focal point is correspondingly short and, when large radii are involved, the length of the focal point is correspondingly long, in order to ensure the necessary application of energy to the dividing line.

To prevent the work piece material from melting, the method is carried out according to one embodiment of the invention in such a fashion that the laser output is adjusted as a function of the length of the linear focal point.

The generation of an optimal thermal mechanical tension in the work piece can be achieved when the cold spot is moved along behind the linear focal point in such a fashion that its distance from the starting point of the focal point is constant.

With regard for the device for carrying out the method according to the invention, the object is attained by the fact that an optical system having a scanner for producing a linear focal point is provided, which said optical system is coupled to a numerical trajectory control device via a profile control device that specifies the contour of the focal point by means of axes U and V and via actuators that specify positioning axes X, Y, C of the focal point in relation to the work piece such that trajectory data from the dividing line can be forwarded to the profile control device and the actuators during every scanning motion such that the linear focal point undergoes curvature corresponding to the curvature of the contour of the dividing line and is moveable along said dividing line, and the length of which said linear focal point is also adjustable as a function of the contour of the dividing line.

An optimal separation is ensured when, according to one embodiment of the invention, further axes coupled to the trajectory control device are provided to position the cold spot in relation to the linear focal point and the work piece.

According to a further embodiment of the invention, the device can be designed particularly suitable in nature when the optical system comprises a scanner having two oscillating mirrors oscillating at right angles to each other. To change the length and curvature of the linear focal point, one only need to change the oscillation amplitude of the oscillating mirror, so that the profile control device and the trajectory control device can be designed relatively simple in nature as well. Not only is the oscillation amplitude changed in this process, but so is the mode of motion and the position of the oscillations relative to each other. The oscillations are not harmonic in transitions between curves and straight lines, for example.

BRIEF DESCRIPTION OF THE DRAWING

Further features and advantages of the invention result from the description of an exemplary embodiment shown in the drawing.

DETAILED DESCRIPTION OF THE INVENTION

Figure 1:
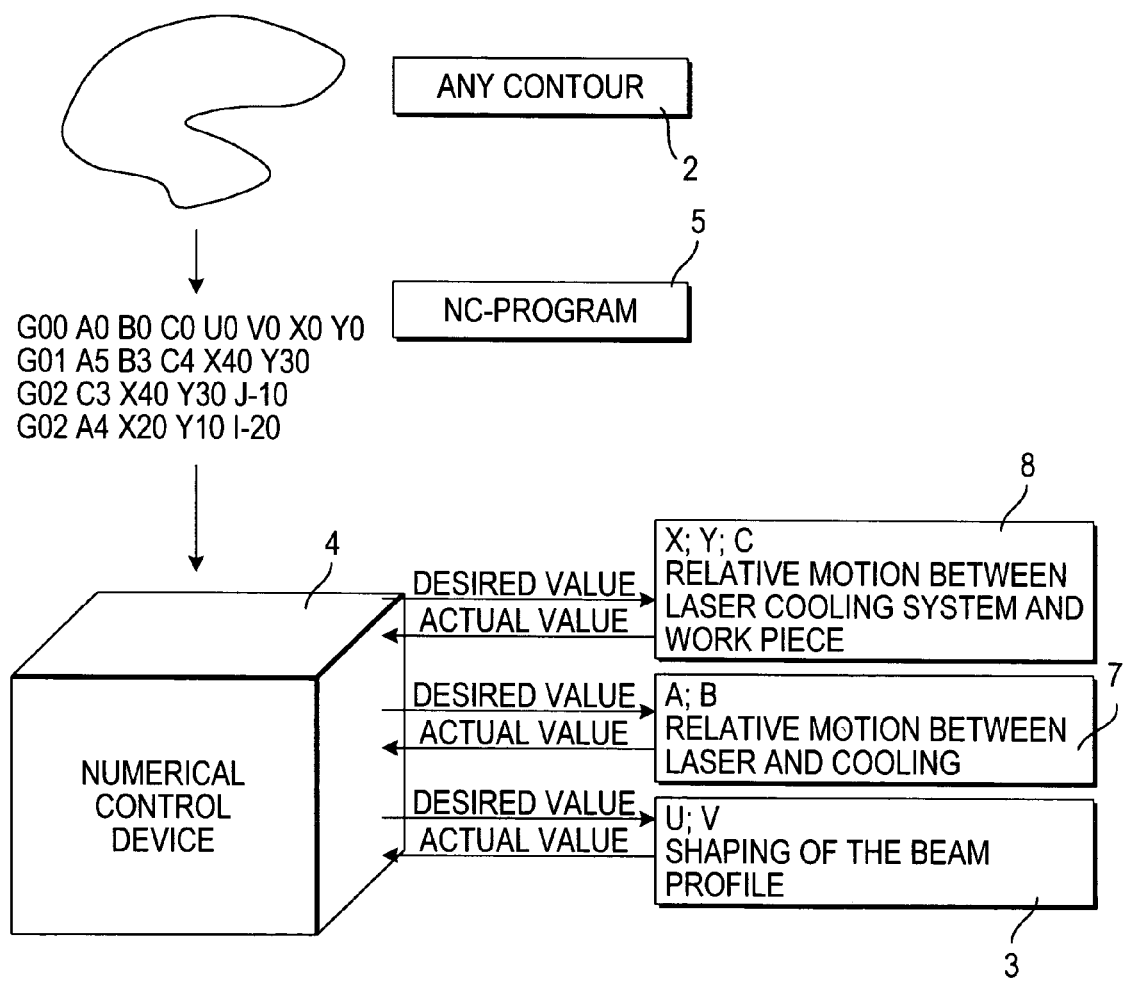
FIG. 1 shows a schematic block diagram of the basic layout of the contour controller of the device according to the invention.
Figure 2:
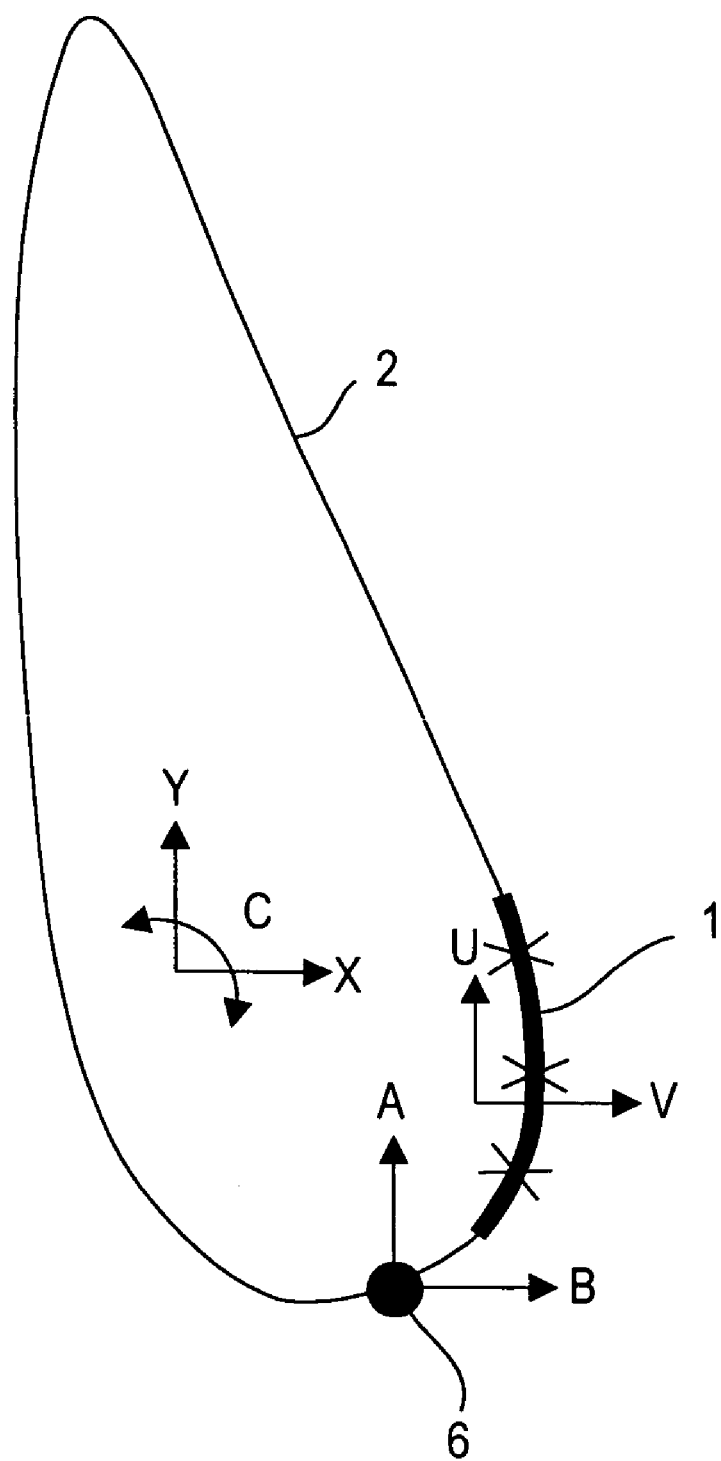
FIG. 2 shows a schematic, diagram-like illustration of the shape of the focal point and the cold spot, as well as the associated axes of motion to be worked by the contour controller.

The principle according to the invention for cutting a flat work piece made of a brittle material, in particular flat glasses, using the laser beam separating method is shown in FIGS. 1 and 2. FIG. 1 shows the principle layout of the control of the sequences of motions along a specified contour. FIG. 2 shows the focal point geometry of the laser beam with the cold spot following it, and the matching of the axes of motion to the contour controller according to FIG. 1.

Figure 3:
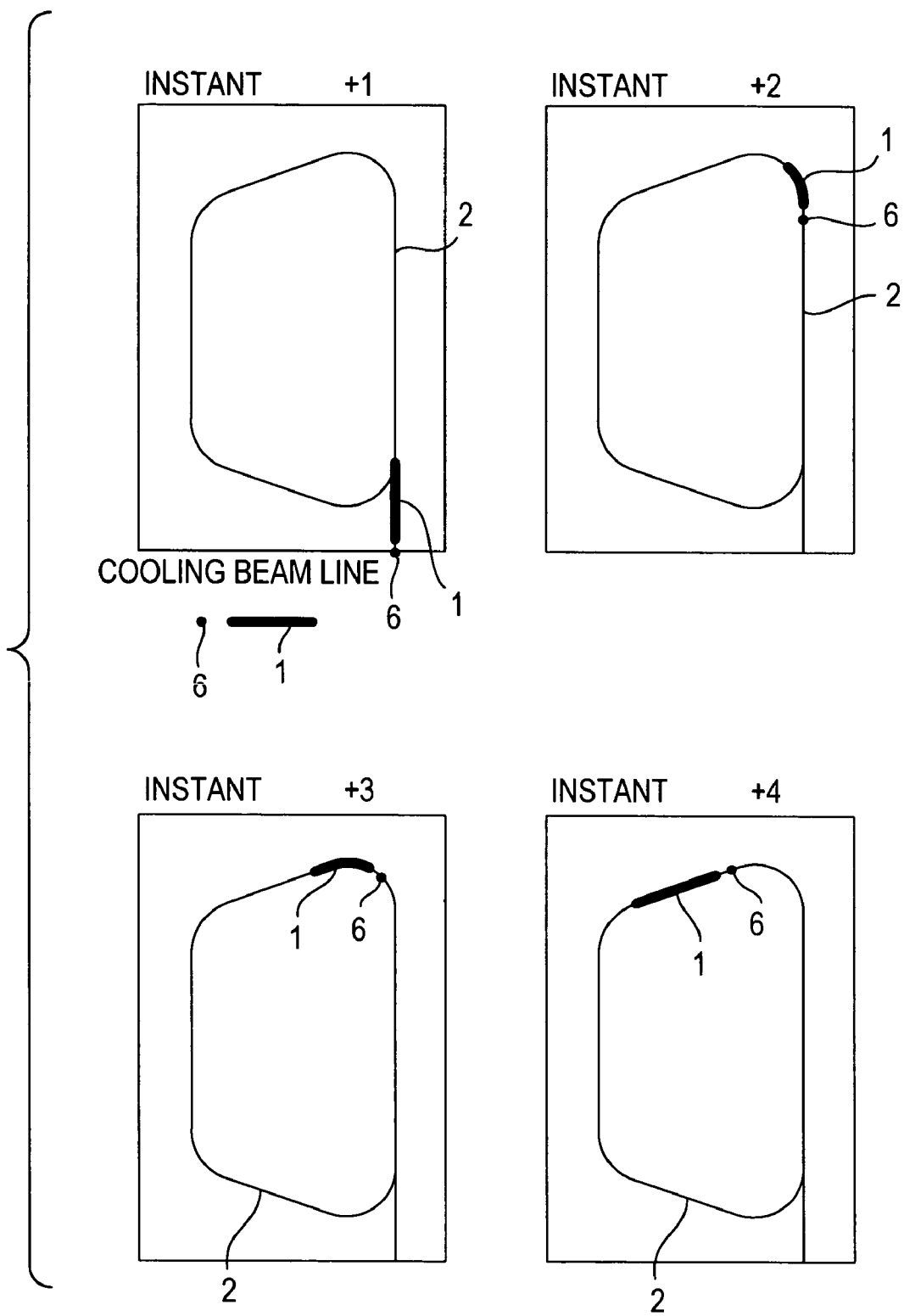
FIG. 3 shows a group of successive action views of the freeform cutting of a work piece along a trapezoidal shaped dividing line accordinq to the method of the invention, in which the length of the linear focal point varies as a function of the curvature of the dividing line.

The separating principle according to the invention is based on a linear focal point 1 that is curved in accordance with the respective contour of the dividing line 2. If the dividing line 2 is linear, the focal line 1 can be relatively long, as shown in FIG. 3. The smaller the radius of curvature of the contour of the dividing line 2 is, the shorter the line 1 must be, so that the main application of energy takes place on the dividing line. The line length varies hereby between 10 mm and 100 mm. In parallel with changing the length of the line, the laser output is regulated suitably downward when short lines are involved, and it is regulated upward when long lines are involved.

To produce the linear focal point 1, a known laser-beam scanner having oscillating mirrors and an oscillator motor that moves them, preferably in the form of a galvanometer mirror, e.g., according to the FIG. 5 of the publication EP 0 872 303 A 2 cited initially, is preferably used. In principle, just one mirror could also be provided that is supported in a fashion that allows it to pivot.

In addition, a scanning procedure can be used that uses a rotating mirror according to FIG. 6 of the aforementioned EP publication (polygonal wheel).

In the typical scanning process using oscillating mirrors, said oscillating mirrors have an oscillation frequency of 400 Hz and higher, whereby the oscillation amplitude of a first oscillating mirror determines the line length, and the oscillation amplitude of the other, second oscillating mirror determines the deviation of the line from a straight line. The scanner is controlled by means of a profile control device 3 shown in FIG. 1. This control device receives—from a numerical control device—the desired value, among other things, for the length of the focal point 1 required at the respective point of the dividing line 2. The profile control device thereby drives the oscillator motor of the first oscillating mirror in such a fashion that it executes the appropriate oscillation amplitude for the required length of the profile. In this process, the profile control device 3 generates an analog voltage fluctuation as the desired value, which said desired value is converted directly by the oscillator motor into an oscillating motion. The desired value—which is forwarded by the numerical control device 4 to the profile control device 3—is transmitted either in the form of an analog constant voltage signal, e.g., 0–10 V, whereby the length is proportional to the voltage, or in the form of a digital value with a resolution of at least 8 bits. The actual-value feedback by the measuring system of the oscillator motor shown in the illustration can be eliminated within the scope of regulation if a calibration curve for the oscillator motor is stored in the profile control device 3 or the numerical control device 4. In addition to the specification of the oscillation amplitude, the scanner receives from the numerical control device 4 data for the axes U, V during each oscillation of the mirror at specified instants—indicated in FIG. 2 using an "X"—which said data control the second oscillating mirror in such a fashion that the focal line 1 is curved in accordance with the contour of the dividing line 2 during the respective oscillation of the first mirror. The more data that can be provided per oscillation, the better the curvature can be approximated.

To ensure that the focal line 1 lies on the desired dividing line 2, the numerical control device 4 controls the NC axes 8 (X, Y and C) and the profile length or its curvature by communicating the desired values of the axes U and V to the profile control device 3 according to a known NC program 5. Using the information about the profile length, its curvature by means of the values for the axes U and V, the position and speeds of the axes X, Y and C, and the shape of the dividing line 2 described by an NC program 5, the numerical control device is capable of guiding the focal line 1 in such a fashion that it follows the dividing line with a maximum deviation of typically less than 0.2 mm. The dividing line is followed that much more exactly the faster the numerical control device is capable of generating new desired values for the axes 8 and the profile control device 3, and the faster these said desired values can be implemented by the axes 8 and the oscillator motors of the oscillating mirror.

FIG. 3 shows an example of a freeform cut having a trapezoidal contour of the dividing line 2 with sharply rounded corners.

The focal line 1 is straight at instant $t_1$, because a straight section is to be separated. At instant $t_2$, the focal line 1 shortens along a sharply curved section of the dividing line. It is then curved and shortened based on the data from the trajectory control device in accordance with the specific contour of the dividing line.

At instant $t_3$, the focal point 1 is situated on a less curved section of the separating line 2. As a result, it is less curved and also somewhat longer than at instant $t_2$. At instant $t_4$, the focal point 1 is again situated in a linear section, and it has the same dimensions that it did in instant $t_1$.

The width of the focal line 1 is specified by the diameter of the focused laser beam on the work piece surface. The diameter on the work piece surface is typically between 0.3 mm and many millimeters. Optical elements are used to focus the laser beam. In selecting the optical elements and the laser, the objective is to distribute the intensity evenly along the line without any local intensity peaks. In this manner, the greater part of the laser energy can be injected into the work piece without exceeding the glass softening temperature. For this purpose, focusing elements having a long focal length of approximately 300 mm and above, top-hat lenses, axicons or lasers having a ring mode or multi-mode can be used. The width of the line depends thereby on the required laser output, cooling, material type, material thickness and feed rate.

A linear profile of any length and shape can be provided using the method according to the invention.

To increase the thermal mechanical tension, cooling is carried out in known fashion using a cold spot 6 situated at a defined distance behind the laser profile, i.e., the focal line 1, on the contour 2 to be cut. This cold spot 6 is produced, for example, by means of a cold jet of air or a gas/liquid mixture injected via a nozzle.

Due to the high temperature produced in the work piece by means of the laser beam, a high thermal mechanical tension is created along the contour to be cut in the work piece. When cooling is applied subsequently and the glass is weakened in advance at the starting point of the cut/fissure, the glass cracks along the contour described by the cooling nozzle and the "beam line".

Due to the heating of the work piece achieved along the contour to be cut and the cooling carried out following it on the contour at a defining distance of between approximately 2 mm and 15 mm, the cut follows any possible free form very precisely. In this fashion, any possible geometry can be cut in thin glass (approx. 50 $\mu$m), as well as thick glass (many millimeters), or scribing can be carried out at a depth of up to many tenths of millimeters.

The advantage of cutting lies in the fact that subsequent breaking is not required, which eliminates a finishing step. The advantage of scribing lies in the fact that, at much higher speeds (up to 1000 mm/s), the material was separated nearly fragment-free even after breaking and, due to the lack of micro-cracks and chips, a markedly higher edge rigidity is obtained.

In order to achieve this, the cooling, i.e., the position of the cold spot 6 relative to the focal line 1, must also be adjusted very precisely.

The axes 7 (A and B) shown in FIG. 1—which are responsible for the trailing guidance of the cooling nozzle along the dividing line 2—are also connected to the numerical control device 4. The axes A and B also interpolate with the axes X, Y, C and the axis specified by the oscillator motor of the first oscillating mirror.

The object of the axes A and B is to maintain a constant distance between the cold spot 6 and the starting point of the focal line 1. The profile control device 3 can hereby be designed so that the lowest voltage value of the fluctuating voltage for the oscillator of the oscillating mirror always remains constant. This ensures that this starting point is stationary. The axes 7 A and B therefore need only cover short distances.

To simplify the construction of the system, the axis A can be eliminated in one variant of the implementation. In this fashion, a non-constant distance between the cooling and the starting position of the focal line results when the contour is followed. This situation can be offset while reducing the cutting speed by adapting the process parameters.

"Axes" in the context of the invention should be understood to mean not only the geometric axes, but also the associated moving members, such as actuators and the like, that specify the axes.

What is claimed is:

1. A device for cutting flat work pieces made of a brittle material, said device comprising:
    means for moving a linear focal point of a focused laser beam along a dividing line on a work piece, said dividing line having a specific contour;
    means for moving a cold spot along said dividing line following said linear focal point;
    means for scanning said laser beam in an oscillatory manner, so that the linear focal point is produced on the dividing line on the work piece, said means for scanning comprising an optical system with a scanner;
    means for providing trajectory data regarding a course and the specific contour of the dividing line from a numerical trajectory control device to a profile control device that specifies a curvature and a length of the linear focal point and to an actuating means that specifies a position of the linear focal point on the dividing line;
    means for controlling the curvature of the linear focal paint with the profile control device during the scanning so that all points of the linear focal point lie on or coincide with the dividing line; and
    means for adjusting a scanning amplitude so as to adjust the length of said linear focal point as a function of the specified contour of the dividing line.

2. The device according to claim 1, wherein said scanner has two oscillating mirrors oscillating at right angles to each other for positioning the linear focal point on the dividing line.

3. The device according to claim 1, wherein said means for moving the cold spot positions and guides the cold spot in relation to the linear focal point according to the trajectory data from the numerical trajectory control device, so that said cold spot is a constant distance from the linear focal point.

4. The device according to claim 1, further comprising means for distributing laser energy uniformly over said length of the linear focal point.

5. The device according to claim 1, further comprising means for controlling laser beam energy according to said length of said linear focal point.

6. A device for cutting flat work pieces made of a brittle material, said device comprising
- means for moving a focal line of a focused laser beam along a dividing line on a work piece, said dividing line having a specific contour;
- means for moving a cold spot along said dividing line following said focal line;
- means for scanning the laser beam in an oscillatory manner, so that the focal line is on the dividing line on the work piece, said means for scanning comprising a scanner with an optical system;
- a numerical control device for determining a respective curvature and length of the focal line at a corresponding position on the dividing line from trajectory data regarding a course and the specific contour of the dividing line, so that the length of the local line depends on the specific contour of the dividing line; and
- a profile control device for controlling said scanner according to the respective curvature and length of the focal line determined by the numerical control device, so that all points of the focal line lie on or coincide with the dividing line.

7. The device according to claim 6, further comprising means for controlling laser beam energy according to said length of said focal line.

8. The device according to claim 7, wherein said brittle material is glass and said means for controlling the laser beam energy keeps a predetermined temperature along the length of the focal line on the work piece below a softening point of said glass.

9. The device according to claim 7, further comprising means for distributing laser beam energy uniformly over the length of the focal line.

10. The device according to claim 7, wherein said scanner has two oscillating mirrors oscillating at right angles to each other for positioning the focal line on the dividing line.

11. The device according to claim 7, wherein said means for moving the cold spot positions and guides the cold spot in relation to the focal line so that said cold spot is a constant distance from a starting point of the focal line.

* * * * *